United States Patent [19]
Watt

[11] 3,764,009
[45] Oct. 9, 1973

[54] APPARATUS FOR USE IN THE FRACTIONATION OF PROTEINACEOUS SOLUTIONS

[75] Inventor: John G. Watt, Bonnyrigg, Midlothian, Scotland

[73] Assignee: National Research Development Corporation, London, England

[22] Filed: Jan. 31, 1973

[21] Appl. No.: 328,358

Related U.S. Application Data
[63] Continuation of Ser. No. 23,833, March 30, 1970, abandoned.

[52] U.S. Cl............ 210/96, 210/177, 210/DIG. 23, 165/163, 252/360, 259/4
[51] Int. Cl............................................ B03d 3/02
[58] Field of Search.................... 23/258.5; 165/163; 210/23, 42, 51, 52, 96, 175, 177, DIG. 23; 252/359, 360; 259/4; 260/112.5

[56] References Cited
UNITED STATES PATENTS

| | | | |
|---|---|---|---|
| 3,554,714 | 1/1971 | Johnson............................ | 259/4 X |
| 3,482,625 | 12/1969 | Bray................................ | 165/163 X |
| 3,401,096 | 9/1968 | Wondrak........................... | 203/87 |
| 3,382,227 | 5/1968 | West et al........................ | 260/112.5 |
| 3,361,732 | 1/1968 | Dazey et al...................... | 260/112.5 |
| 3,123,593 | 3/1964 | Allen et al....................... | 260/112.5 |
| 3,025,565 | 3/1962 | Dorial et al...................... | 264/102 |
| 2,917,229 | 12/1959 | Benedetto et al................. | 233/11 |
| 2,576,006 | 11/1951 | Ferry............................... | 260/112.5 |
| 2,369,095 | 2/1945 | Wendt.............................. | 260/120 |
| 723,152 | 3/1903 | Gurber............................. | 233/11 X |

FOREIGN PATENTS OR APPLICATIONS

| | | | |
|---|---|---|---|
| 670,439 | 4/1952 | Great Britain..................... | 202/81 |
| 631,737 | 11/1949 | Great Britain..................... | 165/163 |

Primary Examiner—Samih N. Zaharna
Assistant Examiner—Robert H. Spitzer
Attorney—Thomas B. Van Poole et al.

[57] ABSTRACT

In the fractionation of liquid proteins, an increased rate of producton without denaturing is obtained by use of apparatus including
(a) a heat-exchanger for throughflow of a cooling fluid whereby the heat-exchanger presents cooling surfacing for contact by a throughflowing liquid; and
(b) a pair of nozzles for discharging respectively jets of proteinaceous solution and liquid precipitant, the nozzles being so disposed that the jet liquids convergingly merge to form a composite stream which impinges on the cooling surfacing of the heat exchanger and instantly on impingement becomes a reaction mixture containing the precipitated protein fraction which reaction mixture then flows over the cooling surfacing and from the heat exchanger.

12 Claims, 11 Drawing Figures

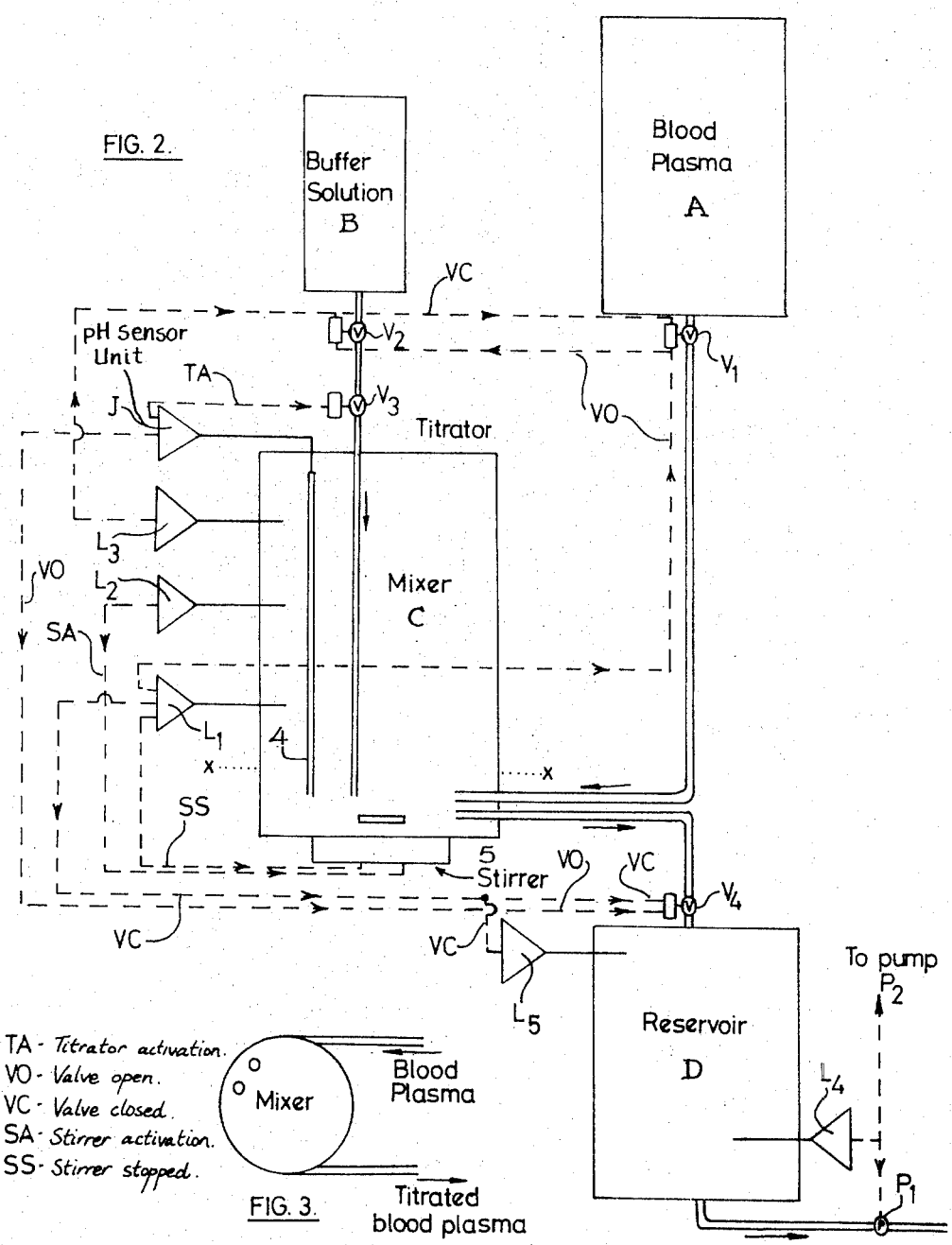

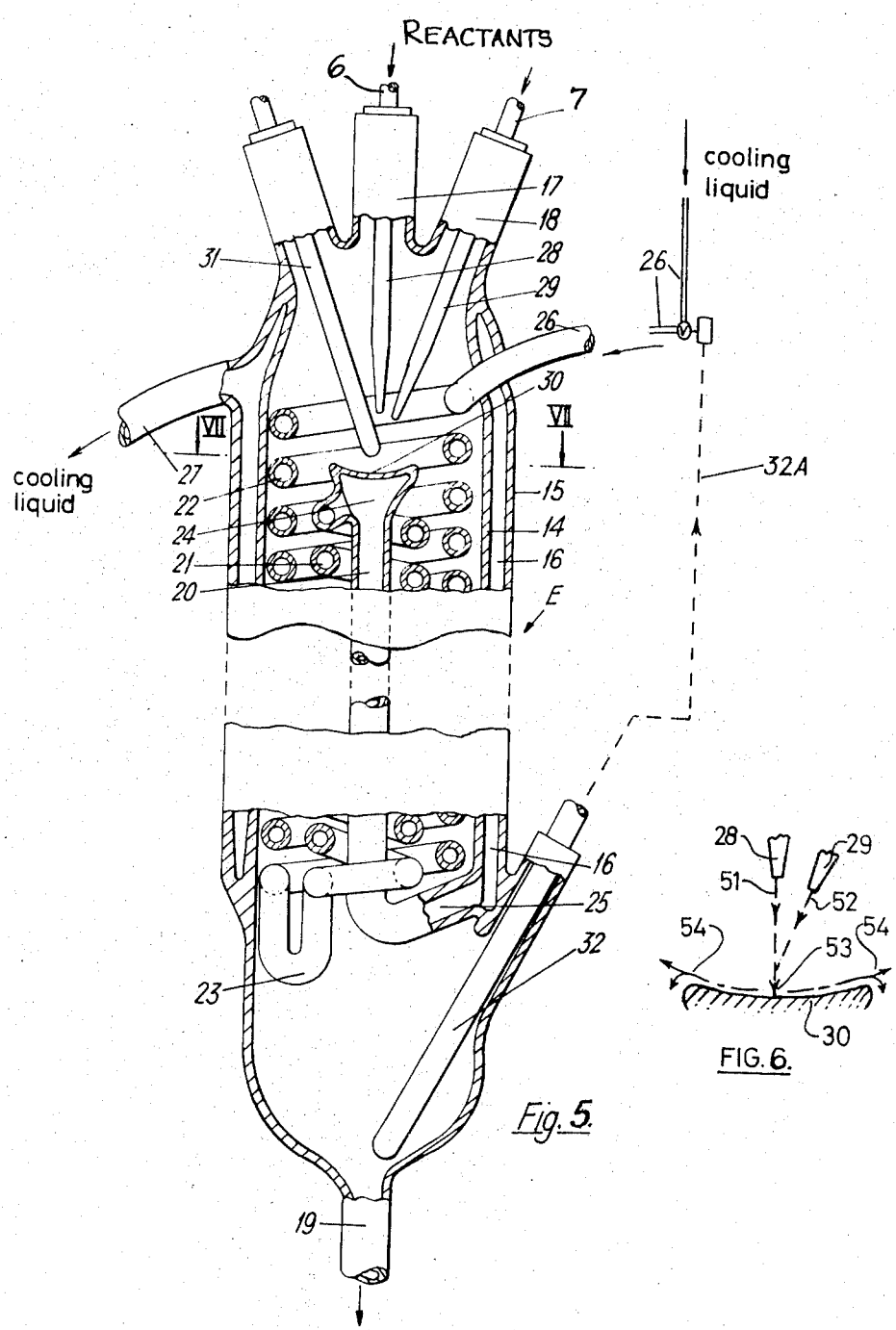

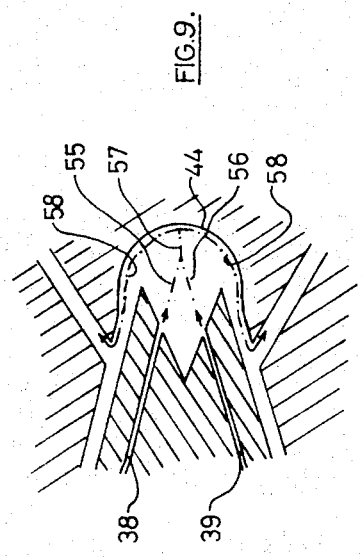
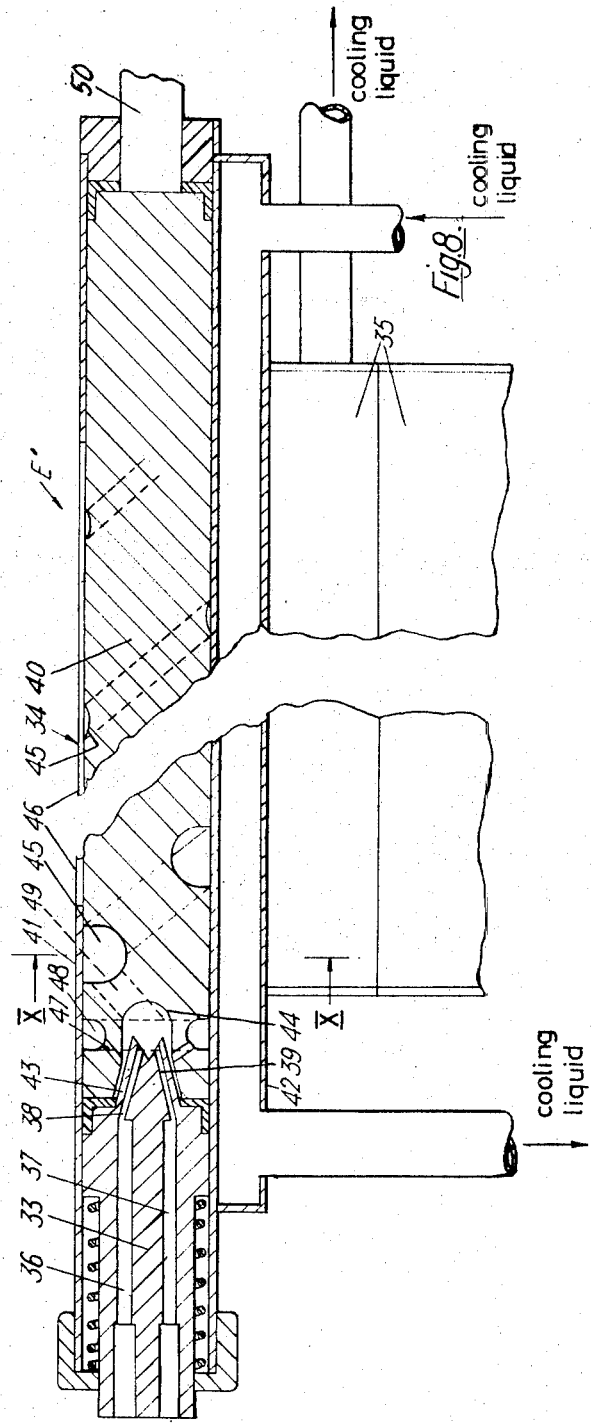

APPARATUS FOR USE IN THE FRACTIONATION OF PROTEINACEOUS SOLUTIONS

This is a continuation of application Ser. No. 23,833 filed Mar. 30, 1970 now abandoned.

BACKGROUND OF THE DISCLOSURE

The invention is of special application to the fractionation of blood proteins for the production of substances useful in blood transfusion technology and will, for convenience, be described principally in connection with the preparation of human plasma protein fractions. Nevertheless, it will be understood that the invention has a wider application to the fractionation of proteinaceous materials of many kinds, e.g. enzyme materials.

The fractionation of blood proteins is now generally practised according to the alcohol precipitation method introduced by E.J. Cohn. Cohn's method depends on balancing the precipitation action of the organic solvent with the solvent actions of the electrolytes present, whereby a series of conditions may be established at which the solubility of any particular protein will remain relatively constant. The solubility of certain other proteins may, in some of these conditions, be such that reasonably pure separations may be possible.

In such a method five independent variables are usually controlled:
1. Electrolyte concentration.
2. Alcohol concentration.
3. Hydrogen ion concentration.
4. Temperature.
5. Protein concentration.

In practice, cooled plasma is treated with the reagents in very large vessels. Thus after pH adjustment the plasma or a sub−fraction thereof is cooled to a specific temperature at or below 0° C. to avoid denaturation of the protein and to achieve conditions for correct precipitation. Precipitation is achieved by adding the precipitant, usually ethanol, with stirring, the quantity of ethanol being predetermined to achieve a final concentration appropriate to the separation of a desired protein fraction. Stirring of the mixture cannot be carried out efficiently without extensive foaming which is undesirable; the process is essentially a slow one with the result that the concentration of precipitant varies continuously up to the point at which all the precipitant has been added. Consequently, precipitation of fractions takes place en route, and a long period of ageing is required in order to approach final equilibrium. It is in practice very rare to achieve the equilibrium condition required, and the final product is almost invariably contaminated. Such bulk systems also have the disadvantage that large volumes of plasma liquor are continually at risk due to plant failure or staff errors. Again, a long settling or "ageing" period has been considered necessary in the past in order to achieve protein fractions having a physical form which permits their ease of recovery by centrifugation, filtration or other standard methods.

The precipitant may be selected from pure and mixed organic solvents, and aqueous or organic-solvent solutions of organic or inorganic precipitants, e.g. ammonium sulphate and other electrolytes. With these precipitants notably ethanol, a heating effect is obtained on dilution and in these circumstances, efficient cooling to prevent any substantial rise in the temperature of the mixture is highly important.

It is an object of the present invention to provide apparatus in which the maintenance of the mixture at a steady temperature is efficiently achieved.

Another object of the present invention is to provide for a continuous flow of proteinaceous solution of predetermined pH value.

SUMMARY OF THE INVENTION

I have discovered that the required control of the temperature of the reaction can be obtained by use of equipment including a pair of nozzles for discharging jets of respectively the proteinaceous solution and a liquid precipitant and disposed so that the jet liquids merge to form a composite stream which impinges on an adjacent cooling surface of a heat exchanger through which cooling fluid is passing. The composite stream instantly on impingement becomes a reaction mixture containing the precipitated protein fraction, and the reaction mixture flows over the cooling surface and from the heat exchanger.

I have further discovered that the required continuous supply of proteinaceous solution of predetermined pH value can be provided by including in the equipment titrating means comprising a mixer for liquids, a pair of supply tanks respectively for proteinaceous solution and buffer solution connected to the mixer to supply the solutions thereto, pH sensing means associated with the mixer for contact by the liquid mixture, and valve means between the supply tank for buffer solution and the mixer and in operative connection with the pH sensing means to control the flow of buffer solution into the mixer whereby the pH value of the proteinaceous solution is controlled.

An embodiment of the invention will now be described by way of illustration with reference to the accompanying drawings in which:

FIG. 2 is a schematic view of the control system of the titrating means of FIG. 1.

FIG. 3 is a sectional top plan view on the line X—X of FIG. 2.

FIG. 5 is a sectional elevation of the reaction means of FIG. 1.

FIG. 6 is an enlarged fragmentary detail view clarifying the flow paths of the merging jet fluids in the embodiment of FIG. 5.

FIG. 8 is a sectional elevation of alternative reaction means for FIG. 1.

FIG. 9 is an enlarged fragmentary detail view clarifying the flow paths of the merging jet fluids in the embodiment of FIG. 8.

Figure 1:
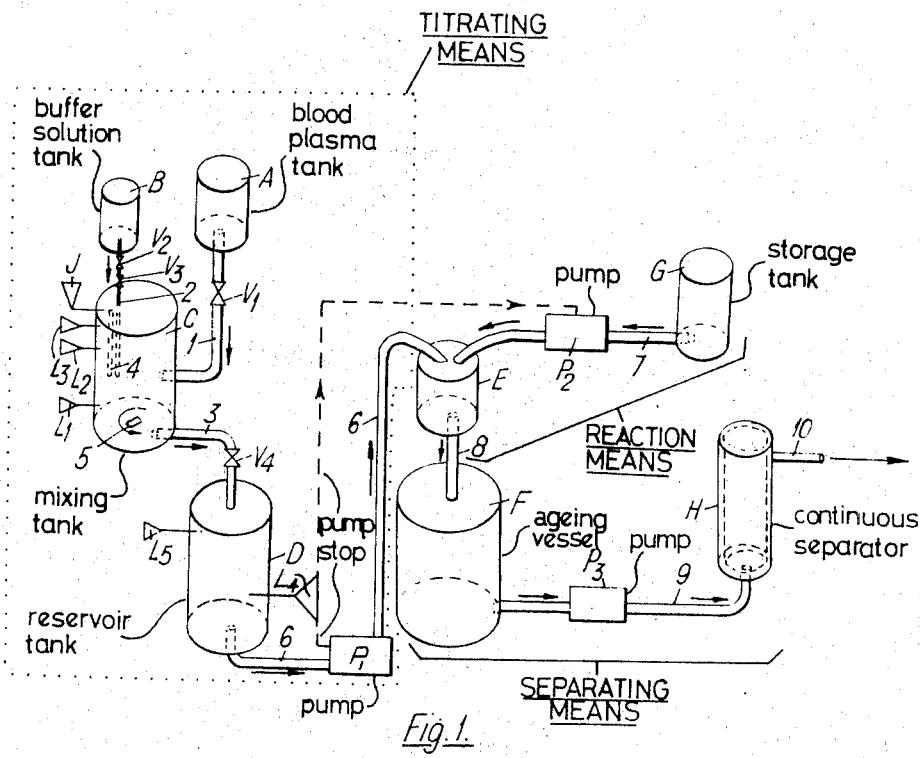
FIG. 1 is a schematic view of apparatus for use in recovering protein fractions from proteinaceous solutions and including titrating means and reaction means.

Referring to FIGS. 1–3 of the drawing: A tank A supplies blood plasma and a tank B supplies a buffer solution. The tanks A and B are connected to a mixing tank C by lines 1 and 2 respectively. Entry valves V1 and V2 control the flow through the lines 1 and 2. C is a cylindrical, lidded, stainless vessel with a charge outlet line 3 controlled by an outlet valve V4. The tank C has the proteinaceous liquid inlet and the charge outlet disposed tangentially in the tank wall below the tank's lowermost liquid level to provide for submerged tangential inflow and outflow so that foaming of the charge in the tank is reduced. A pH sensing device J has its electrode 4 disposed with its tip level with the outlet end of the line 1, and the buffer entry line 2 is disposed with its outlet in the stream passing between the outlet of line 1 and the electrode tip. The unit J is a commercially available electrometric unit. Such a unit includes a Radiometer PHM26 in conjunction with a Radiometer TTT11 and provides for pH measurement in combination with an autotitrator which includes a valve V3 in the line 2 and which is accurate to within 0.05 pH units in the range of pH 4.5 to 8.5. The electrode 4 of the unit J is designed to operate at temperatures in the range +10° C to −10° C. The mixing tank C is mounted on a strong magnetic stirring unit 5 which includes an 80 mm. bar magnet coated with polytetrafluoroethylene and located in the vessel as a stirrer. The design of this stirring unit is such that a speed of 50–100 revolutions per minute can be continued reliably. The tank C is fitted with a series of level-sensing probes L1, L2, L3. The probes L1 and L3 are used to control the liquid valves V1, V2 and V4 which in turn control the movement of liquid into and from the tank C, the control being such that the tip of the electrode 4 is always under liquid. In use of this titrating means liquid flows by gravity from the tank A into the tank C and over the electrode 4 of the pH sensing device J, and because of the tangential entry a rotational movement of liquid in the tank C is created. As the entry liquid bathes the electrode 4, the pH is measured; in the event of pH adjustment being required, the valve V3 of the autotitrator connected to the pH sensing device J operates to allow the entry of buffer liquid from the tank B to the tank C. When the tank C is full to the upper liquid level, probe L2 is activated to cause activation of the magnetic stirrer 5 which maintains the rotational movement of the liquid in the tank. When the required pH value is achieved (±0.05), the pH sensor unit J opens the valve V4 and liquid leaves the tank C through the valve-controlled line 3 until the falling level activates the probe L1 which closes the valve V4. The level of the probe L1 is so located that the electrode and the liquid inlet and outlet openings are under said level. Activation of the probe L1 is also used to stop the stirring device 5 and open the entry valves V1 and V2 to initiate the titrating cycle. The probe L3 prevents overflow by closing valves V1 and V2.

Titrated liquid leaving the tank C flows through the line 3 to a reservoir tank D.

The reaction means for the liquid reactants consists of a mixing and cooling unit E. The reservoir tank D is connected by line 6 to the unit E, and a metering pump P1 in the line 6 delivers liquid from the tank D to the unit E. A storage tank G for liquid precipitant is connected to the unit E by a line 7, and a metering pump P2 in the line 7 delivers the precipitant to the unit E. The tank D possesses liquid-level probes L4 and L5 which provide that the liquid in the tank is replenished from the tank C. In the event that there is no liquid in the tank C, the liquid level in the tank D falls to the level of the probe L4 which then stops the metering pumps P1 and P2 and so obviates the danger which would arise if the plasma pump P1 failed to pass liquid whilst the precipitant pump P2 continued to operate. The level probe L5 prevents overflow by closing the valve V4.

The cool liquid mixture discharged by the unit E runs freely downwards through a line 8.

Separating means for the cool liquid mixture from the unit E consists of a thermally insulated aggregating (or ageing) vessel F embodying a cooling circuit, a continuous centrifugal separator H having a discharge line 10, a line 9 connecting the vessel F with the separator H and a metering pump P3 in the line 9. The line 8 passes through the roof of the vessel F so that ejected mixture is directed against the inner aspect of the wall of the vessel such that it flows down the wall to the surface of the liquid mixture in the vessel. In this way there is little mixing of any liquid already in the vessel with the liquid entering. The vessel is provided with a flat roof which carries the probe of a capacitance level indicator (not shown) sheathed in polytetrafluoroethylene.

At the start of a mixing/cooling stage there is no liquor in the ageing vessel F, but as the mixture level rises, the ageing vessel tends to fill up. The volume of the vessel F is chosen such that the whole ageing volume can be contained in the vessel and so that the liquid level is as high as possible. Liquid is not removed from the vessel F until the mixing/cooling stage has been in operation for a period equivalent to the ageing period. At the end of this time, the liquid from the lower region of the vessel F is metered off at a rate equal to the sum of the plasma and precipitant flows, from the vessel by the pump P3 which injects the aged liquor via line 9 into the continuous separator H. At this stage the ageing vessel F contains a relatively tall cylinder of liquor aged for decreasing lengths of time according to its position in the cylinder, fully aged liquor being at the bottom and freshly added liquor at the top of the cylinder. Because of the gentle manner in which the liquor is added to the vessel there is no foaming of the added liquor and little mixing thereof with the liquor already in the vessel. By allowing the operative ageing period to be some 15 minutes longer than that considered the necessary minimum, there is no danger of inadequately aged liquor being passed to the separator H. Also, by using a relatively tall cylindrical vessel as the ageing vessel F, the slight mixing effect at the addition point is made relatively less in comparison to the full "layer" depth in the vessel. The supernatant liquid is passed from the separator H through the line 10, and may be stored for further processing to yield further fractions. The liquor entering the ageing vessel is already at the optimum precipitation temperature. While the heat insulation reduces the rate of heat input to the vessel to a relatively low level, it is insufficient to maintain complete temperature stability; the cooling circuit within the vessel ensures complete thermal stability.

The apparatus can be conveniently arranged in the form of a unit module designed to perform a particular fractionation and in practice it will be desirable to provide a number of such modules working in sequence to separate different fractions from blood or other source material.

Alternatively, the apparatus may take the form of a single mobile unit which, with its necessary supply tank, can be moved close to the site of the centrifugal separator in a refrigerated work area. In this position the apparatus is capable of adjusting the pH of the plasma to within desired limits and mixing the adjusted liquor with precipitant in optimum concentration. By adjustment of the volume and type of buffer solution employed, the apparatus is also capable of changing the ionic strength of the plasma within acceptable limits.

Figure 4:
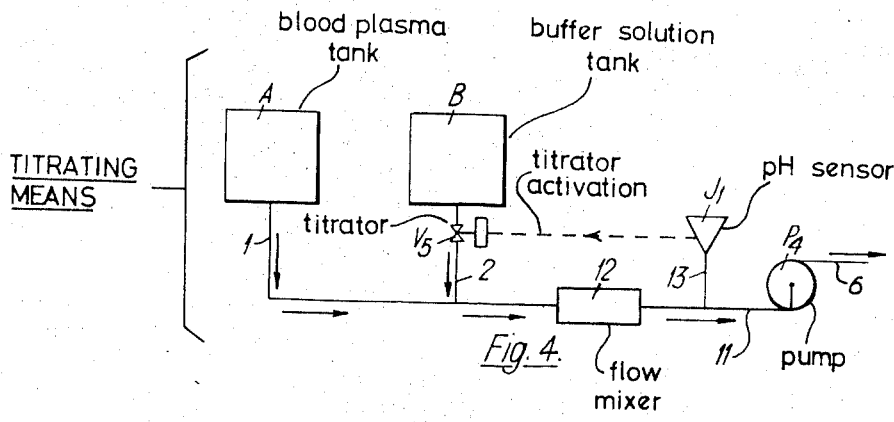
FIG. 4 is a schematic view of alternative titrating means for the apparatus of FIG. 1.

FIG. 4 is a schematic representation of alternative titrating means. The outlet lines 1 and 2 of the vessels A and B respectively discharge into a tube or a flow mixer 12 designed to effect mixing of the streams. The electrodes 13 of a pH sensing unit J1 which is operatively connected to a titrator including a valve V5 in the line 2, are inserted in a line 11 forming the outlet duct of the mixer 12. A pump P4 pressurises the liquid mixture and passes it directly through line 6 to the mixing/cooling unit E. This system of in-line mixing obviates the use of the reservoir tank D and its associated instrumentation.

The apparatus described with reference to FIGS. 1 and 4 constitutes a processing unit designed to isolate one protein fraction from the plasma. A number of such units may be interconnected to isolate a number of protein fractions from the plasma. Thus, the supernatant liquid from the line 10 may be processed or may be combined with the supernatant liquid from some other stage before being processed.

Figure 7:
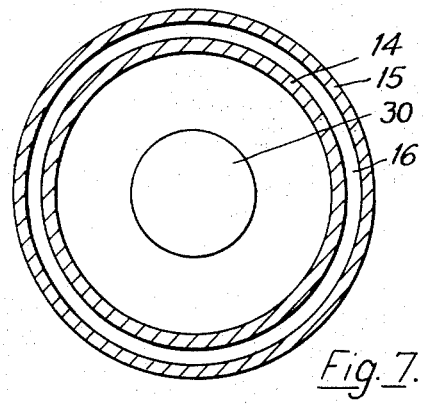
FIG. 7 is a section on the line VII — VII of FIG. 5.

In FIGS. 5 to 7 the mixing/cooling unit E of the apparatus of FIGS. 1 to 4 includes a heat exchanger having an upright tubular casing 14, a jacket 15 for the casing forming an annular coolant space 16, and a nest of coolant tubing 20, 21, 22 in the casing which has at its upper end a pair of inlets 17 and 18 for the liquid reactants and at its lower end an outlet 19 for the liquid mixture. The coolant tubing is composed of a central upright stem 20 and inner and outer oppositely wound helical coils 21 and 22 surrounding the stem. The coils communicate with each other at their lower ends through a tube portion 23, and the upper end of the coil 21 communicates at 24 with the upper end of the stem 20 whereof the lower end communicates with the lower end of the space 16 through a tube portion 25. Liquid coolant passes into the top of coil 22 and through an inlet tube 26 and passes from the top of the jacket 15 through an outlet tube 27. The inlets 17 and 18 carry a pair of convergent nozzle tubes 28 and 29 which receive the liquid reactants from the feed lines 6 and 7 of FIG. 1 and discharge the reactants as fine jets. The upper end of the stem 20 is enlarged to present a circular, shallowly dished, cooling end wall 30 forming a receiver. The outlets of the nozzles 28 and 29 face the receiver bottom which is spaced below the junction of the convergent jets issuing from the nozzles. Thermometers 31 and 32 project into the vessel respectively at the inlet and outlet ends thereof. The thermometer 32 is a platinum resistance thermometer operatively connected through line 32A (FIG. 5) to valve means in the inlet tube 26 to effect adjustment of the temperature of the mixture leaving the vessel by causing variation of the flow of liquid coolant through the heat-exchanging ducting.

In operation of the unit E, with the liquid coolant flowing through the nest of tubing 20 – 22 and through the jacket 15, the nozzles 28 and 29 are disposed so that the jet streams merge and form a composite stream which impinges on said cooling end wall 30. The flow paths of this arrangement are shown more clearly in fragmentary FIG. 6, wherein the converging streams of fluid are designated 51 and 52, the zone of confluence of the streams being just prior to impingement of the composite stream at 53 on the surface of the receiver 30. The composite stream instantly on impingement becomes a reaction mixture which spills from the receiver 30 as shown by flow paths 54. The flow rates of the jets are such that the composite stream contains the concentration of precipitant required to precipitate the desired protein fraction. The reaction mixture containing the protein fraction as precipitate spills from the receiver 30 and flows as a film downwards over the cooling surfaces of the tubing 20 – 22 and thence through the casing's outlet 19 for collection in the ageing vessel F of FIG. 1. Control of the temperature of the mixture is effected from the instant of its formation unitl its discharge from the casing.

Figure 10:
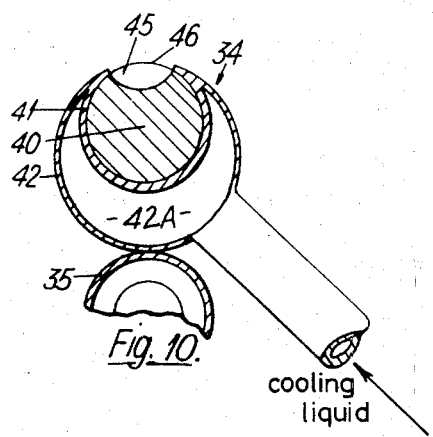
FIG. 10 is a section on the line X — X of FIG. 8.

A mixing/cooling unit E' which is an alternative to the unit E of FIGS. 5 to 7 is shown in FIGS. 8 to 10. The unit embodies a rotor-and-tube device 34 which comprises nozzle means in the form of a jet head 33 for the liquid reactants; and a heat exchanger having an elongated horizontal cylindrical casing 42 defining a passageway 42A for throughflow of coolant, a device in the casing for throughflow of mixture and including a cylindrical tube 41 and a helically grooved rotor 40 in the tube 41; and a cooler 35 of the double-walled corrugated sheet type to receive mixture from the tube 41. The jet head 33 includes a pair of parallel passages 36 and 37 which receive the liquid reactants from the feed lines 6 and 7 of FIG. 1 and communicate with a pair of convergent capillary nozzle passages 38 and 39. The rotor 40 bears on the inner end of the jet head 33 which plugs an end of the tube 41, and a frusto-conical nose portion 43 of the jet head has the convergent nozzle passages therethrough and projects into a corresponding bore in the end of the rotor, said bore terminating in a cup-shaped receiver 44. The outlets of the nozzle passages face the receiver wall which is spaced beyond the junction of the convergent jets. The convergent nozzle passages are disposed so that the jets merge slightly in front of the base of the cup-shaped receiver 44; and form a composite stream which impinges in the bottom of said receiver and instantly on impingement becomes a reaction mixture. Reference to FIG. 9 clarifies the flow paths of the merging jet streams and resultant reaction mixture; in this Figure the converging streams are designated as 55 and 56, and the merged composite stream is designated 57. The resultant flow of the reaction mixture as it leaves the bottom of the receiver 44 is designated by the flow paths 58. The rotor 40 has therein a helical groove 45 which tapers from end to end of the rotor. The aforesaid rotor-and-tube device 34 forms a helical tubular passage for liquid mixture which discharges through an axial slot 46 in the wall of the tube 41. A series of radial passages 47 in the rotor end connect the receiver 44 with an annular groove 48 also in the rotor end, and a passage 49 connects the annular groove with the adjacent end of the helical groove 45. The rotor is power-driven through a spindle 50 on an end of the rotor.

The amount of precipitant in the composite stream is proportioned to ensure instant precipitation of the desired protein fraction.

In operation of this unit E', the rotor-and-tube device 34 in the casing is cooled by the throughflowing coolant in the casing, so that the receiver 44 presents a cooling surface on which the composite stream impinges. The reaction mixture containing the precipitate is centrifugally discharged from the receiver 44 through the radial passages 47 and into the annular groove 48 and thence is axially fed through the tubular passage and is forcibly discharged through the slot 46 to flow as a film downwards over the cool external surface of the casing wall 42. The film of mixture then cascades over the cooler 35 which discharges the cooled mixture for collection in the ageing vessel F of FIG. 1. Thus, the temperature of the mixture is readily controlled from the instant of its formation unit its discharge from the casing.

It is preferable that all the metering pumps used in the apparatus are gear pumps which supply a substantially pulse-free flow. The motors used are preferably air-driven in view of the fire hazard associated with the use of large amounts of ethanol as a precipitant.

The process of the invention is illustrated by the following Examples.

EXAMPLE 1

The proteinaceous material used was blood plasma isolated from blood, collected in A.C.D. solution, by centrifuging at 2,000 x g for 2 hours.

The pH of the plasma was adjusted to 7.1 ± 0.05 in the titrating means using a 0.5M sodium bicarbonate as a buffer solution. Throughout the process the temperature was maintained at −1° C. The pH-adjusted plasma was fed at a rate of 15 litres/hour into the mixing/cooling unit along with 53.3 percent aqueous ethanol solution as precipitant at a rate of 2.550 litres/hour. The mixture produced was aged for 2.15 hours and then centrifuged to give a solid fraction ($F_1$) and a supernatant liquid ($S_1$).

Figure 11:
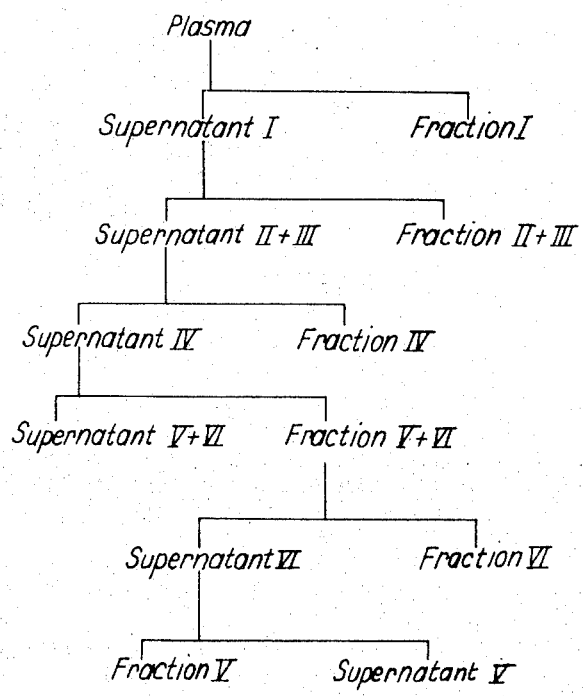
FIG. 11 is a schematic representation of the sequence of a precipitation described in examples tabled on page 18 of the specification.

Examples 2 to 6 are summarised in Table 1 as follows:

The sequence of precipitations described in the foregoing Examples is illustrated schematically in FIG. 11. Thus, the supernatant liquid ($S_1$) was processed to give a fraction $F_{11+111}$ and supernatant liquid $S_{11+111}$.

Similarly $S_{11+111}$ gave $S_{IV}$ and $F_{IV}$, $S_{11}$ gave $S_{V+VI}$ and $F_{V+VI}$. $F_{V+VI}$ was redissolved and processed to produce $F_{VI}$ and $S_{VI}$ was produced to give $F_V$ and $S_V$.

Typical analyses of the various fractions and supernatant liquids are given in Table 2 as follows:

TABLE 2

| Fraction material | Total protein g./l. plasma | Composition | | | | |
|---|---|---|---|---|---|---|
| | | Albumin | α-Globulins | β-Globulins | Fibrinogen | γ-Globulins |
| Fraction I | 1.75 | 0.57 | 0.01 | 0.06 | 1.05 | 0.05 |
| Supernatant I | 56.3 | 32.71 | 7.20 | 7.43 | 3.49 | 6.47 |
| Fraction 11 & III | 7.17 | 0.67 | 0.52 | 1.55 | 1.38 | 3.05 |
| Fraction IV | 7.30 | 1.30 | 2.80 | 1.90 | 0.0 | 1.30 |
| Supernatant IV | 28.6 | 27.71 | 0.40 | 0.0 | 0.0 | 0.49 |
| Fraction V & IV | 18.5 | 17.44 | 0.28 | 0.22 | 0.0 | 0.56 |
| Supernatant V & VI | <1.0 | | | | | |
| Fraction V | 16.3 | 15.56 | 0.41 | 0.33 | 0.0 | 0.0 |
| Supernatant V | <1.0 | | | | | |

The particular fractionation sequence described in the Examples is only one of many possible sequences for obtaining different fractions. Also, the sequence may be extended by redissolving any of the fractions and reprocessing same to obtain a fraction of a different composition. Also, the separated supernatant liquids may be further processed either individually or in admixture one with another.

By virtue of the invention proteinaceous material may be fractioned into protein fractions containing interesting chemical entities. A general process of performing fractionation of proteinaceous material is provided and is not limited to the Examples but extends to the production of other fractions which may be isolated by judicious adjustment of the process parameters. The process has been illustrated with reference to blood plasma, but other proteinaceous material, e.g. enzyme-containing liquids, may be used equally well as starting material.

What is claimed is:

1. Apparatus for use in recovering a protein fraction from a solution of proteinaceous material by reacting the solution with a liquid precipitant, said apparatus including in combination:

reaction means comprising (a) a heat-exchanger apparatus provided with a casing having a double walled passageway means therein for throughflow of a fluid constituting a heat-exchanging cooling

TABLE 1

[All stages operate on the supernatant of the previous stage with the exception of Example 5 which is the precipitation of the resolubilised Fraction V+VI]

| Example No.: | Fraction isolated | Adjustment of pH | Buffer | Temp. (0° C.) | Plasma flow rate (l/hr.) | Ethanol flow rate (l/hr.) | Conc. ethanol solution (percent) | Ageing time (hrs.) |
|---|---|---|---|---|---|---|---|---|
| 2 | 11+111 | 6.9±0.05 | 0.05 M, acetic acid | −6 | 17.0 | 4.080 | 96.0 | 2.15 |
| 3 | IV | 5.85±0.05 | 1 M, acetic acid | −8 | 21.0 | 5.628 | 96.0 | 2.15 |
| 4 | V+VI | 4.80±0.05 | 1 M, acetic acid in 40% ethanol | −8 | 26.2 | | | 2.15 |
| 5 | VI | ¹4.8 | | −6 | 15.0 | 3.465 | 53.3 | 2.15 |
| 6 | V | 4.9±0.05 | 0.5 M, sodium bicarbonate | −8 | 18.2 | 9.555 | 96.0 | 2.15 |

¹ Not adjusted.

fluid, and an axial space in said casing for throughflow of a liquid; said heat-exchanger apparatus including a heat transfer device within said axial space, said device in conjunction with said casing defining liquid passageway means for throughflow and exit therefrom of said liquid; said heatexchanger apparatus thereby providing cooling surfacing for contact by said liquid; and (b) a pair of nozzles for discharging respectively jets of said solution and said liquid precipitant; said nozzles disposed so that said jet liquids convergingly merge to form a composite stream which impinges upon said cooling surfacing and instantly upon impingement becomes a reaction mixture containing the precipitated protein fraction, and said reaction mixture constituting the said liquid which then flows over said cooling surfacing and from said passageway means.

2. Apparatus as defined in claim 1, said heat transfer device comprising tubing for conducting a throughflow of said cooling fluid to provide cooling surfacing, said tubing embodying an upright helical-coil formation and having at its upper end a wall portion with a top cooling surface for impingement by the composite stream so that the reaction mixture flows over the tubing and from the casing.

3. Apparatus as defined in claim 2, wherein said tubing embodies also an upright axial portion disposed within the said helical-coil formation and having at its upper end said wall portion.

4. Apparatus as defined in claim 3, wherein said double walled passageway means of said heat-exchanger casing and said tubing are interconnected so that cooling fluid flows from one into the other.

5. Apparatus as defined in claim 1, wherein said heat transfer device within said axial space comprises a generally cylindrical rod extending longitudinally and in contact with the casing and constituting a peripherally helically grooved rotor within said casing forming in conjunction with said casing the said passageway means; said rotor being cooled by said casing and having an end surface thereof at the entrance to said passageway means for impingement by the composite stream.

6. Apparatus for use in recovering a protein fraction from a liquid solution of proteinaceous material by reacting the solution with a liquid precipitant, said apparatus including in combination: (i) titrating means having a mixer for receiving and mixing liquids, a pair of supply tanks respectively for proteinaceous solution and a buffer solution connected to said mixer to supply the solutions thereto, pH sensing means operatively associated with said mixer for contact by the liquid mixture, and valve means connected between said supply tank of buffer solution and said mixer and in operative connection with said pH sensing means to control the flow of buffer solution into said mixer whereby the pH value of the proteinaceous solution is controlled; (ii) reaction means comprising (a) a heat-exchanger apparatus provided with a casing having a double walled passageway means therein for throughflow of a fluid constituting a heat-exchanging cooling fluid, and an axial space in said casing for throughflow of a liquid; said heat-exchanger apparatus including a heat transfer device within said axial space, said device in conjunction with said casing defining liquid passageway means for throughflow and exit therefrom of said liquid; said heat-exchanger apparatus thereby providing cooling surfacing for contact by said liquid; and (b) a pair of nozzles for discharging respectively jets of said solution and said liquid precipitant; said nozzles disposed so that said jet liquids convergingly merge to form a composite stream which impinges upon said cooling surfacing and instantly upon impingement becomes a reaction mixture containing the precipitated protein fraction, and said reaction mixture constituting the said liquid which then flows over said cooling surfacing and from said passageway means; one of said nozzles being connected to said titrating means so as to receive as its liquid a proteinaceous solution of predetermined pH value from said mixer; the other of said nozzles being connected to a supply tank of liquid precipitant whereby the liquids intermix and react together upon said impingement to form said reaction mixture containing the precipitated protein fraction; and (iii) separating means connected to said reaction means to receive the reaction mixture and to separate the protein fraction therefrom.

7. Apparatus as defined in claim 6, wherein said mixer of said titrating means includes a vessel, valve means for controlling both the flow of solutions from said supply tanks to said vessel and the flow of mixture from the vessel, and level-sensing means associated with said vessel and operatively connected to said valve means to provide for repeated charging and discharging of said vessel.

8. Apparatus as defined in claim 7, wherein said vessel of said titrating means has the proteinaceous solution inlet and the charge outlet disposed tangentially in said vessel wall below said vessel's lowermost liquid level to provide for submerged tangential inflow and outflow so that foaming of the charge in the vessel is reduced.

9. Apparatus as defined in claim 6, wherein said mixer of said titrating means is a flow mixer having an outlet duct connected to the proteinaceous liquid nozzle of said reaction means; and the pH sensing means project into said outlet duct.

10. Apparatus as defined in claim 6, said heat transfer device comprising tubing for conducting a throughflow of said cooling fluid to provide cooling surfacing, said tubing embodying an upright helical-coil formation and having at its upper end a wall portion with a top cooling surface for impingement by the composite stream so that the reaction mixture flows over the tubing and from the casing.

11. Apparatus as defined in claim 10, wherein said tubing embodies also an upright axial portion disposed within the said helical-coil formation and having at its upper end said wall portion.

12. Apparatus as defined in claim 6, wherein said heat transfer device within said axial space comprises a generally cylindrical rod extending longitudinally and in contact with the casing and constituting a peripherally helically grooved rotor within said casing forming in conjunction with said casing the said passageway means; said rotor being cooled by said casing and having an end surface thereof at the entrance to said passageway means for impingement by the composite stream.

* * * * *